US006433499B1

United States Patent
Cote et al.

(10) Patent No.: US 6,433,499 B1
(45) Date of Patent: Aug. 13, 2002

(54) DEVICE AND METHOD FOR AUTOMATIC TENSION TRANSDUCER CALIBRATION

(75) Inventors: Kevin Lauren Cote, Durham; Lothar John Schroeder, Portsmouth, both of NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/725,556

(22) Filed: Nov. 29, 2000

(51) Int. Cl.$^7$ ................................................. H02P 7/00
(52) U.S. Cl. ........................ 318/432; 318/6; 318/434; 101/463.1; 226/42; 226/44; 226/45; 226/111; 242/75.44; 242/75.51; 242/418.1; 242/419
(58) Field of Search .................... 318/6, 432, 434; 101/463.1; 242/75.44, 75.51, 418.1, 419; 226/42, 44, 45, 111

(56) References Cited

U.S. PATENT DOCUMENTS

| | | | | |
|---|---|---|---|---|
| 3,829,745 A | * | 8/1974 | Ha et al. ........................ 318/6 |
| 3,910,521 A | * | 10/1975 | O'Callaghan et al. ... 242/75.51 |
| 4,015,794 A | * | 4/1977 | Meihofer ................. 242/75.44 |
| 4,097,005 A | * | 6/1978 | Sieger ........................ 242/189 |
| 4,942,343 A | * | 7/1990 | Orlicki et al. ................. 318/6 |
| 4,347,993 A | * | 9/1992 | Leonard .................. 242/75.51 |
| 5,602,747 A | * | 2/1997 | Rajala .................... 364/469.01 |
| 5,659,229 A | * | 8/1997 | Rajala ............................ 318/6 |
| 5,727,724 A | * | 3/1998 | Dowling ..................... 226/181 |
| 5,826,513 A | * | 10/1998 | Fromson et al. ......... 101/463.1 |
| 6,106,177 A | * | 8/2000 | Siegl et al. ................. 400/618 |

* cited by examiner

Primary Examiner—Robert E. Nappi
Assistant Examiner—Tyrone Smith
(74) Attorney, Agent, or Firm—Davidson, Davidson & Kappel, LLC

(57) ABSTRACT

An apparatus for calibrating a tension transducer for a web includes a pair of nip rollers and a motor for driving at least one of the pair of nip rollers, the motor having at least one roller output being a function of at least one of a motor torque and a motor velocity. A web tension transducer roll is located upstream of the nip rollers, the web tension transducer having a tension output being a function of the actual web tension of the web. A processor receives the at least one roller output and the tension output, the processor calculating a tension correction value as a function of the at least one roller output and the tension output. Also provided is a method for calibrating a tension transducer for a web comprising the steps of running the web over a tension transducer and through nip rollers, the nip rollers being run by a motor, varying a characteristic of the motor and reading actual reference signals from the transducer as the characteristic is varied, and calculating at least one correction value as a function of the actual reference signals.

21 Claims, 4 Drawing Sheets

DEVICE AND METHOD FOR AUTOMATIC TENSION TRANSDUCER CALIBRATION

BACKGROUND OF THE INVENTION

1. Field of the Invention

The present invention relates generally to web printing presses and more particularly to a device and method for calibrating a web tension transducer.

2. Background Information

Web printing presses print a continuous web of material, such as paper. In order to do so, tension measurements of the web can be critical to the operation of a web press. Different paper types produce differing amounts of tension in the web proportional to the speed of the web and the paper modulus.

One way to measure web tension is using analog tension transducers. However, existing tension transducers are analog devices and require frequent calibration, so that an electrical signal produced by the transducer can be correlated properly to actual web tensions. The current calibration procedure is performed when the web is not operating by a manual measurement of signals produced by the transducer. This method is time consuming and the accuracy is a function of human performance. Moreover, the calibration must be conducted when the press is not in operation. This can result in lost production due to the downtime required for calibration of the tension transducer and poor press performance resulting from the erroneous tension information supplied by uncalibrated tension transducers.

BRIEF SUMMARY OF THE INVENTION

An object of the present invention is to provide a device and method for providing a process of automatic tension transducer calibration. An additional or alternative object of the present invention is to provide a method for calculating the amount of tension in a paper at a discrete speed.

The present invention provides an apparatus for calibrating a tension transducer for a web including a pair of nip rollers and a motor for driving at least one of the pair of nip rollers, the motor having at least one roller output being a function of at least one of a motor torque and a motor velocity. A web tension transducer roll is located upstream of the nip rollers, the web tension transducer having a tension output being a function of the actual web tension of the web. A processor receives the at least one roller output and the tension output and calculates a tension correction value as a function of the at least one roller output and the tension output.

The tension transducer thus can be calibrated without manual interference, using the tension correction value.

The tension correction value further may be a function of a predicted web tension, which may be determined using a radius of the transducer roll, or a predicted change in web tension, which may be determined using a paper modulus.

Preferably, the at least one roller output includes both a motor torque output and a motor velocity output.

The processor then outputs a calibrated web tension value as a function of the tension output and the tension correction value, and may also calculates a breakaway torque of the motor as well as a correction offset of the tension output.

The processor can calculate a correction factor, which can be the tension correction value, as a function of the at least one roller output and the predicted web tension or predicted change in web tension.

The present invention also provides a method for calibrating a tension transducer for a web comprising the steps of:

running the web over a tension transducer and through nip rollers, the nip rollers being run by a motor;

varying a characteristic of the motor and reading actual reference signals from the transducer as the characteristic is varied; and calculating at least one correction value as a function of the actual reference signals.

The method may further comprise reading a first signal from the tension transducer at a known web tension, preferably zero, so as to determine a correction offset, and may further include determining a breakaway torque of the motor. The method may include repeating the step of determining a breakaway torque a plurality of times, so as to calculate an average value for the breakaway torque.

The characteristic preferably is a motor torque and the varying step occurs between the breakaway torque and a predetermined torque. The actual reference signals then may be linearized so as to form an actual tension versus torque line.

Alternatively, the characteristic may be a motor velocity and the varying step may include changing a motor velocity with respect to a nominal velocity. The at least one correction value preferably then is further a function of a known paper modulus.

The actual reference signals are compared to a predicted data set, the at least one correction value preferably including a correction factor being a function of the actual reference signals and the predicted data set.

The method may further comprise calculating a calibrated web tension output as a function of actual signals from the tension transducer and the least one correction value.

The characteristic preferably is a motor torque value or a motor velocity value.

The calculating step may further include calculating a ratio of a predicted data angle over a measured data angle, so as to form a correction factor.

BRIEF DESCRIPTION OF THE DRAWINGS

A preferred embodiment of the present invention is described below by reference to the following drawings, in which.

DETAILED DESCRIPTION

Figure 1:
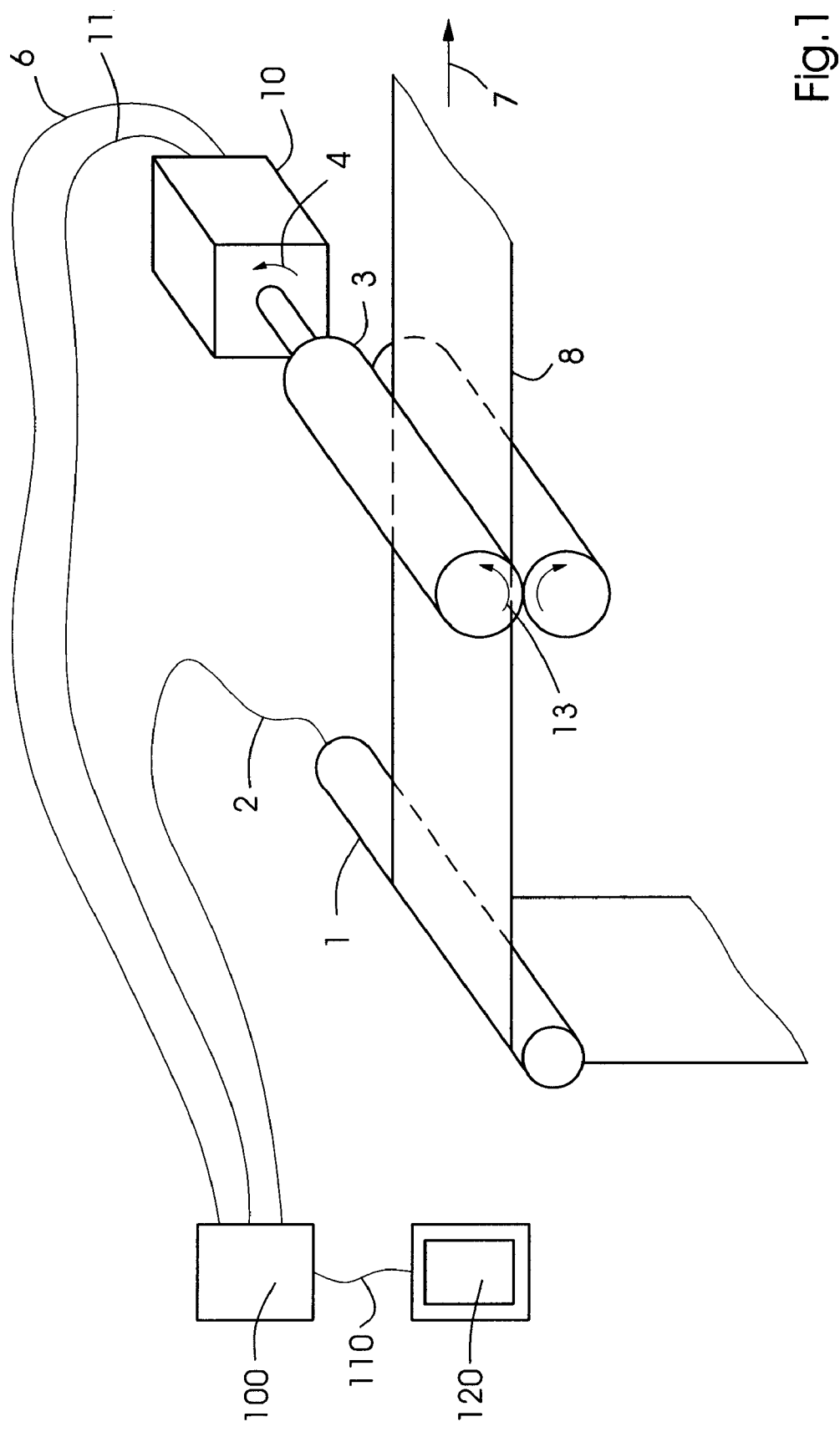
FIG. 1 shows a side view of the automatic tension calibration system, which includes a motor and transducer.

FIG. 1 shows a side view of the automatic tension calibration system, which includes a motor 10 and a tension transducer roll 1.

A pair of nip rollers 3 drive a web 8 in a direction 7. The motor 10 drives the nip rollers 3 via a mechanical linkage. The motor 10 transmits a first reference signal 6, which is proportional to a torque 4 of the motor 10, and a second reference signal 11, which is proportional to an angular velocity 13 of the motor 10, to a processor 100 by wireless, optical or electrical connections. Upstream from the nip rollers 3, the tension transducer roll 1 transmits an actual tension signal 2, which is proportional to the tension in the web 8, to the processor 100 by an electrical, optical or wireless connection. During a calibration process, the actual tension signal 2 forms an actual web tension reference signal. The processor 100 transmits a calibrated output signal 110, for example to a display device 120.

Figure 2:
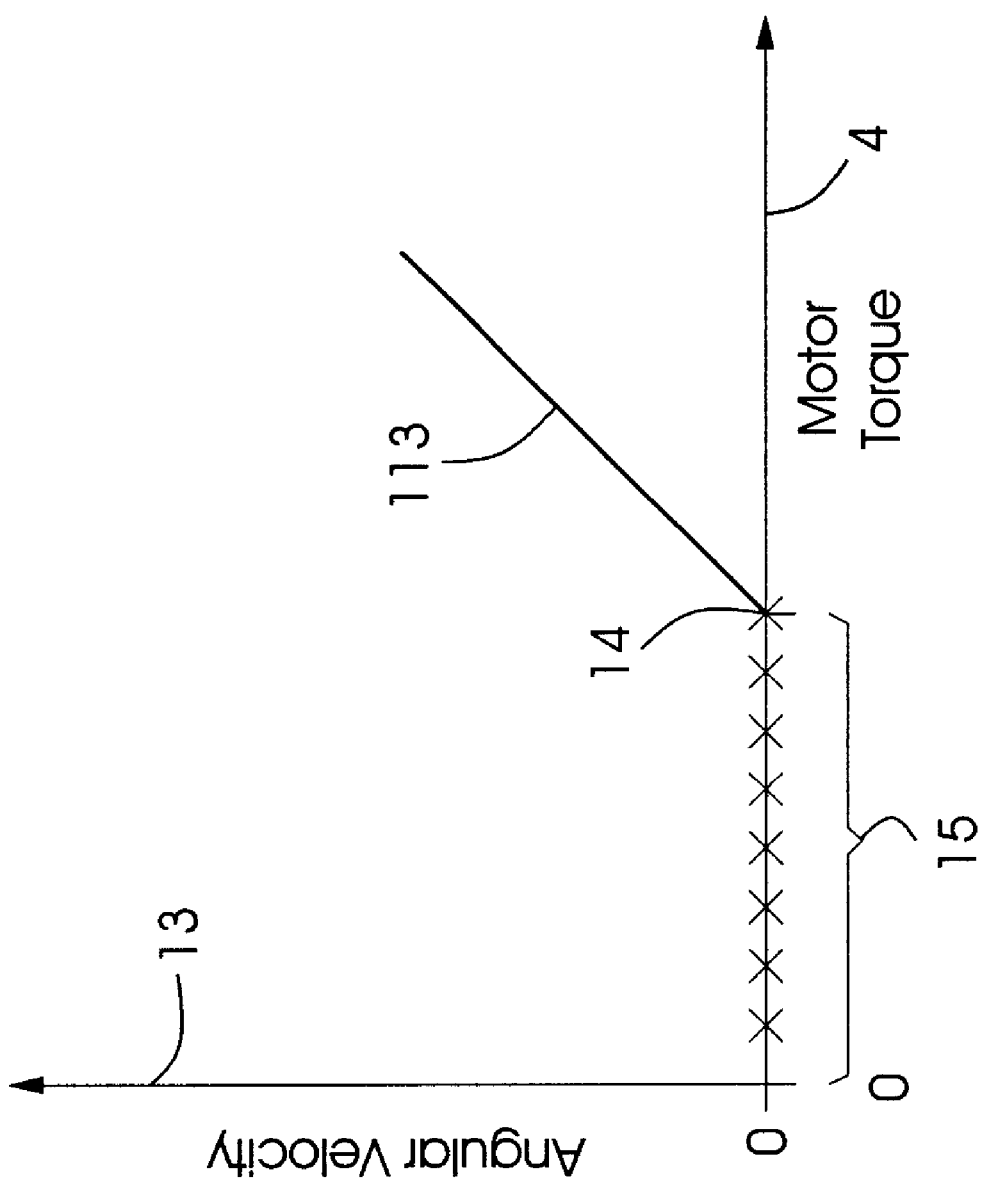
FIG. 2 shows a graph of the angular velocity vs. motor torque.

FIG. 2 shows a graph of the motor angular velocity 13 vs. the motor torque 4. While the web 8 is not in contact with the tension transducer roll 1 or the nip rollers 3, and with the motor 10 and nip rollers 3 stopped, the torque 4 of the motor 10 is increased. The processor 100 determines a breakaway torque 14 by monitoring the angular velocity 13 of the motor 10 by the second reference signal 11 sent from the motor 10. The torque 4 of the motor 10 is increased 15 until an actual angular velocity 113, an angular velocity 13 that causes the nip rollers 3 to rotate, is detected. The highest torque 4 that was transmitted from the motor 10 to the processor 100 by the first reference signal 6, before the actual angular velocity 113 was detected, is recorded as the breakaway torque 14. This process may be repeated a plurality of times so as to calculate an average value for the breakaway torque 14.

Figure 3:
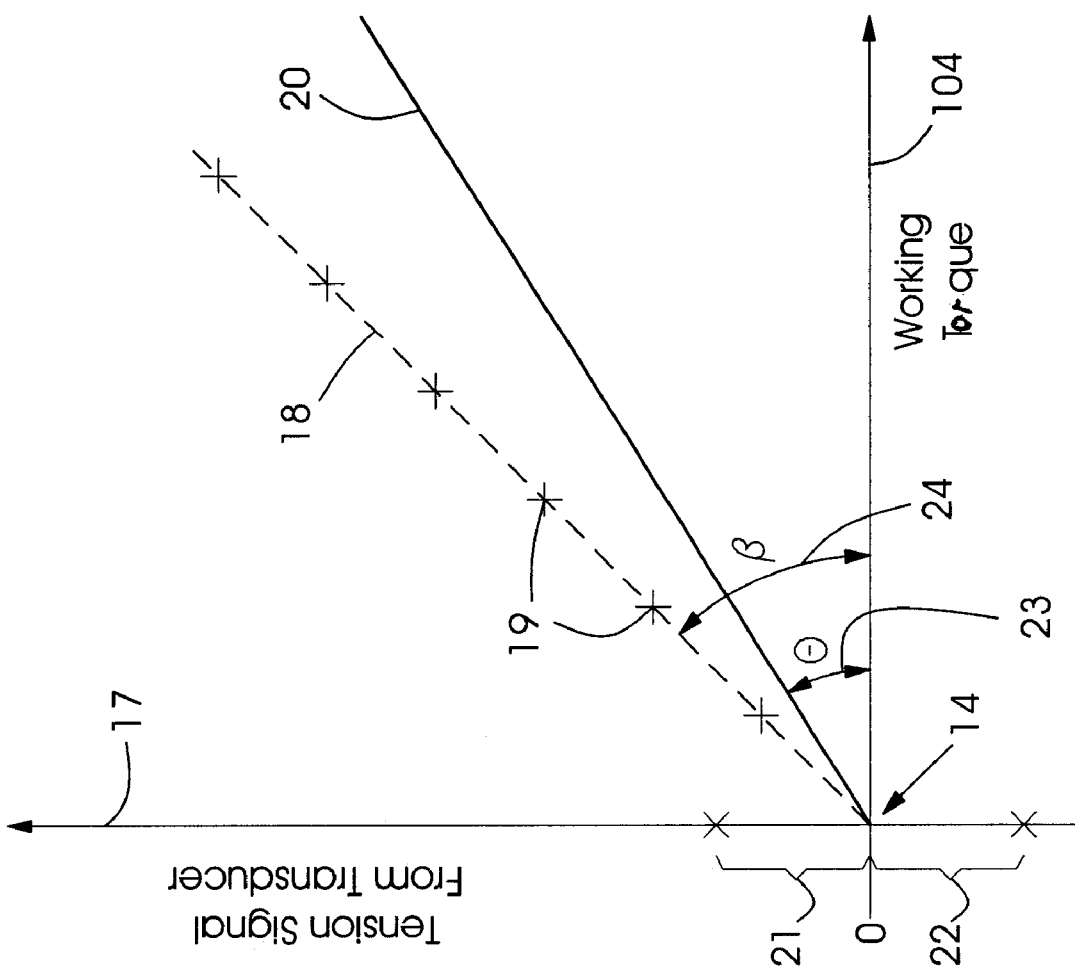
FIG. 3 shows a shows a graph of a web tension vs. working torque.

FIG. 3 shows a graph of a web tension 17 vs. the working torque 104 (which is the motor torque 4 subtracted by the breakaway torque). After the breakaway torque 14 has been calculated and while the web 8 is still not in contact with the tension transducer roll 1 or the nip rollers 3, the processor 100 records the actual reference signal 2 from the tension transducer roll 1 and compares the actual reference signal 2 to a known quantity, in this case zero. Since the web 8 is not in contact with the tension transducer roll 1 or the nip rollers 3, the actual reference signal 2 should read zero. However, if the actual reference signal 2 is non-zero, then the processor 100 determines a correction offset, which can be a positive correction offset 21 or a negative correction offset 22.

The web 8 is then moved, so as to contact the nip rollers 3 and the tension transducer roll 1. While running the web 8 over the web tension transducer roll 1 and through the nip rollers 3, the torque 4 of the motor 10 is increased from the breakaway torque 14 to a predefined upper limit. While the torque 4 of the motor 10 is increased, the tension transducer roll 1 sends at least two actual reference signals 2 to the processor 100. The processor 100 subtracts the correction offset for each of the at least two actual reference signals 2 to produce at least two normalized values or data points 19 corresponding to each of the at least two actual reference signals 2. The processor then linearizes and plots each of the at least two normalized values 19 on the graph of web tension 17 vs. working torque 104. The processor then forms a measured data curve 18 by connecting each of the at least two discrete data points 19. The measured data curve 18 may then be compared to a predicted data curve 20 to determine a correction factor. The predicted data curve in this embodiment is simply a straight line in which the predicted web tension 17 equals the working torque 104 divided by the radius of the tension transducer roll 1, i.e. TN=TQ/R, where TN is the web tension, TQ is the working torque and R is the radius of the roll 1. The processor 100 calculates the angle of the measured data curve 18 with respect to the x-axis, and records the angle as a measured data angle 24. The processor 100 then calculates the angle of a predicted data curve 20 with respect to the x-axis, so as to form a predicted data angle 23. Then, the processor 100 may calculate the ratio of the predicted data angle 23 over the measured data angle 24, so as to form a correction factor.

The processor 100 may then correct future actual tension signals 2, for example during a print run, by subtracting the correction offset from the signals 2 and multiplying the result by the correction factor to produce the corrected actual web tension value 110, i.e. the calibrated web tension value=(actual signal value−correction offset)*the correction factor. The processor 100 may then transmit the calibrated web tension value 110 to the display device 120 or to other parts of the press which may require a web tension measurement.

Figure 4:
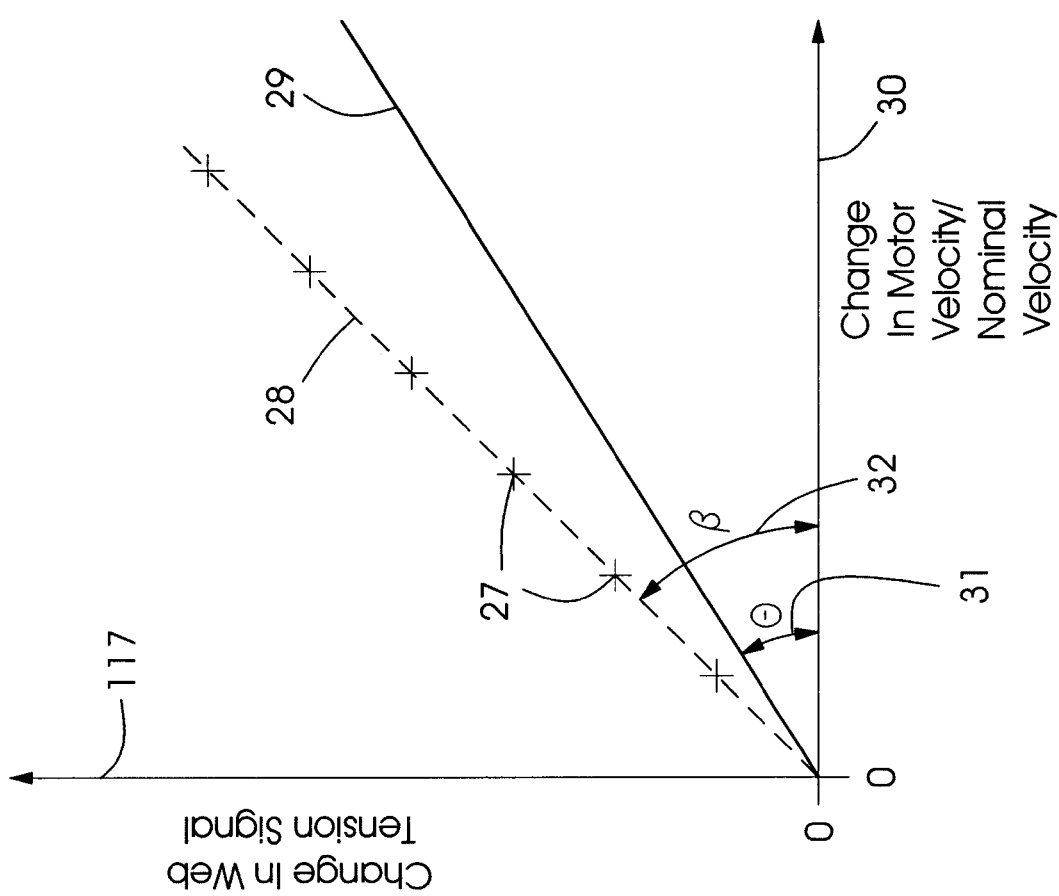
FIG. 4 shows a graph of an alternate embodiment where the breakaway torque need not be calculated, and shows a change in web tension vs. a change in velocity of the motor divided by a nominal velocity.

FIG. 4 shows a graph of an alternate method of the present invention in which the breakaway torque of the motor 10 need not be calculated. The graph shows a change in web tension 117 plotted versus a velocity of the motor 10 divided by a nominal velocity 30.

The tension transducer roll 1 can be automatically calibrated without first determining the breakaway torque 14 as follows. While the web 8 is not in contact with the tension transducer roll 1 or the nip rollers 3, the processor 100 records the actual reference signal 2 from the tension transducer roll 1 and compares the actual reference signal 2 to the known tension quantity, in this case zero, i.e. since the web 8 is not in contact with the tension transducer roll 1, the actual reference signal 2 should read zero. However, if the actual reference signal 2 is non-zero, then the processor 100 determines a correction offset as with respect to the previous method disclosed with respect to FIGS. 2 and 3.

The web 8 is then engaged so as to contact the nip rollers 3 and the web tension transducer roll 1. At a known paper modulus and velocity, the web 8 runs over the web tension transducer roll 1 and through the nip rollers 3. The velocity 30 of the motor 10 is increased slightly several times and the resulting change in tension 27 is recorded, linearized and plotted versus the change in velocity over the nominal velocity. The processor 100 then forms a measured speed data curve 28 by connecting each of the at least two discrete data points 27. The processor 100 may then compare the measured change in tension line 28 to a predicted change in tension curve 29, which is determined by the formula change in web tension dTN equals the known paper modulus E multiplied by the change in velocity dV divided by the nominal velocity V, i.e. dTN=E*DV/V. Next, the processor 100 calculates the angle of the measured speed data curve 28 with respect to the x-axis, so as to form a measured angle 32. The processor 100 then calculates the angle of the predicted curve 29 with respect to the x-axis, so as to form a predicted angle 31. The processor then calculates the ratio of the predicted angle 31 over the measured angle 32, so as to form a correction factor (angle 32/angle 31).

The processor 100 may then determine a calibrated web tension signal in the same manner as the previous embodiment, namely by subtracting the correction offset and multiplying the actual signals 2 by the correction factor to produce the calibrated signals 110. The processor 100 may then transmit the calibrated signals 110, measured speed data curve 28, and predicted speed data curve 29 to the display device 120, or to other parts of the press which require a web tension value.

In some cases, the paper modulus may be unknown; thus, the predicted curve 29 is also unknown. In order to obtain the predicted curve 29, the operator may manually calibrate the web tension transducer roll 1 and produce the resulting predicted curve for that type of paper. The results for different types of paper may be saved and used whenever the same paper is used.

What is claimed is:

1. An apparatus for calibrating a tension transducer for a web comprising:

a pair of nip rollers;

a motor for driving at least one of the pair of nip rollers, the motor having at least one roller output being a function of at least one of a motor torque and a motor velocity;

a web tension transducer roll located upstream of the nip rollers, the web tension transducer having a tension output being a function of the actual web tension of the web; and a processor receiving the at least one roller output and the tension output, the processor calculating a tension correction value as a function of the at least one roller output and the tension output.

2. The apparatus as recited in claim 1 wherein the tension correction value is further a function of a predicted web tension or predicted change in web tension.

3. The apparatus as recited in claim 1 wherein the at least one roller output includes both a motor torque output and a motor velocity output.

4. The apparatus as recited in claim 1 wherein the processor outputs a calibrated web tension value as a function of the tension output and the tension correction value.

5. The apparatus as recited in claim 1 wherein the processor calculates a breakaway torque of the motor.

6. The apparatus as recited in claim 1 wherein the processor calculates a correction offset of the tension output.

7. The apparatus as recited in claim 2 wherein the processor calculates a correction factor as a function of the at least one roller output and the predicted web tension or predicted change in web tension.

8. A method for calibrating a tension transducer for a web comprising the steps of:

running the web over a tension transducer and through nip rollers, the nip rollers being run by a motor;

varying a characteristic of the motor and reading actual reference signals from the transducer as the characteristic is varied; and calculating at least one correction value as a function of the actual reference signals.

9. The method as recited in claim 8 further comprising reading a first signal from the tension transducer at a known web tension so as to determine a correction offset.

10. The method as recited in claim 8 further including determining a breakaway torque of the motor.

11. The method as recited in claim 10 wherein the characteristic is a motor torque and the varying step occurs between the breakaway torque and a predetermined torque.

12. The method as recited in claim 11 wherein the actual reference signals are linearized so as to form an actual tension versus torque line.

13. The method as recited in claim 8 wherein the characteristic is a motor velocity and the varying step includes changing a motor velocity with respect to a nominal velocity.

14. The method as recited in claim 13 wherein the at least one correction value is further a function of a known paper modulus.

15. The method as recited in claim 8 further comprising comparing the actual reference signals to a predicted data set, the at least one correction value including a correction factor being a function of the actual reference signals and the predicted data set.

16. The method as recited in claim 8 further comprising calculating a calibrated web tension output as a function of actual signals from the tension transducer and the least one correction value.

17. The method as recited in claim 9 wherein the known tension is zero.

18. The method as recited in claim 8 wherein the characteristic is a motor torque value.

19. The method as recited in claim 8 wherein the characteristic is a motor velocity value.

20. The method as recited in claim 8 wherein the calculating step further includes calculating a ratio of a predicted data angle over a measured data angle, so as to form a correction factor.

21. The method as recited in claim 8 further including repeating the step of determining a breakaway torque a plurality of times, so as to calculate an average value for the breakaway torque.

* * * * *